US010346473B2

United States Patent
Guegan et al.

(10) Patent No.: US 10,346,473 B2
(45) Date of Patent: Jul. 9, 2019

(54) METHOD AND APPARATUS FOR CREATING A SUMMARY VIDEO (71) Applicant: INTERDIGITAL CE PATENT HOLDINGS, Paris (FR)

(72) Inventors: Marie Guegan, Thorigne-Fouillard (FR); Philippe Schmouker, Betton (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 91 days.

(21) Appl. No.: 15/322,442

(22) PCT Filed: Jun. 25, 2015

(86) PCT No.: PCT/EP2015/064452
§ 371 (c)(1),
(2) Date: Dec. 27, 2016

(87) PCT Pub. No.: WO2015/197791
PCT Pub. Date: Dec. 30, 2015

(65) Prior Publication Data
US 2018/0210954 A1    Jul. 26, 2018

(30) Foreign Application Priority Data
Jun. 27, 2014  (EP) .................................... 14306017

(51) Int. Cl.
*G06F 16/00* (2019.01)
*G06F 16/738* (2019.01)
*G06F 16/33* (2019.01)
*G06Q 50/00* (2012.01)

(52) U.S. Cl.
CPC ........ *G06F 16/739* (2019.01); *G06F 16/3331* (2019.01); *G06Q 50/01* (2013.01)

(58) Field of Classification Search
CPC ......... G06F 17/30843; G06F 17/30657; G06F 16/739; G06F 16/3331; G06Q 50/01
USPC ........................................................ 707/722
See application file for complete search history.

(56) References Cited

U.S. PATENT DOCUMENTS

| | | | |
|---|---|---|---|
| 8,566,315 B1 * | 10/2013 | Davtchev | G06F 16/78 707/736 |
| 8,583,759 B2 | 11/2013 | Harrison et al. | |
| 8,605,221 B2 * | 12/2013 | Deever | G06K 9/00765 348/590 |
| 9,087,131 B1 * | 7/2015 | Gundotra | G06Q 10/10 |

(Continued)

OTHER PUBLICATIONS

Gelenbe et al., "Video Summarization", Computer and Information Sciences, Proceedings of the 25th International Symposium on Computer and Information Sciences 2010, London, England, Sep. 22, 2010, pp. 100, 106.

(Continued)

*Primary Examiner* — Thanh-Ha Dang
(74) *Attorney, Agent, or Firm* — Jeffrey M. Navon (57) ABSTRACT

An automated creation of a summary video based on video segments extracted from several videos by using a social network of viewers and a social curve specified by a user in order to select and order the video segments. A social network of viewers (influence scores, experts) may be used to establish metrics for video segments. A social curve may be defined with respect to the video segment metrics to allow for the automatic creation of a summary video.

20 Claims, 5 Drawing Sheets

(56) References Cited

U.S. PATENT DOCUMENTS

| | | | |
|---|---|---|---|
| 9,685,194 B2* | 6/2017 | Hodulik | G06K 9/00751 |
| 9,792,502 B2* | 10/2017 | Newman | H04N 5/77 |
| 2005/0159956 A1* | 7/2005 | Rui | G06K 9/00711 |
| | | | 704/275 |
| 2005/0254782 A1* | 11/2005 | Hsu | G11B 27/031 |
| | | | 386/283 |
| 2009/0077137 A1* | 3/2009 | Weda | G06F 16/739 |
| 2009/0100454 A1* | 4/2009 | Weber | G11B 27/034 |
| | | | 725/9 |
| 2009/0164904 A1* | 6/2009 | Horowitz | G11B 27/034 |
| | | | 715/723 |
| 2010/0042616 A1* | 2/2010 | Rinearson | G06F 16/9535 |
| | | | 705/12 |
| 2010/0088726 A1* | 4/2010 | Curtis | G11B 27/034 |
| | | | 725/45 |
| 2010/0287475 A1* | 11/2010 | van Zwol | G06F 3/04817 |
| | | | 715/723 |
| 2011/0208722 A1* | 8/2011 | Hannuksela | G11B 27/034 |
| | | | 707/723 |
| 2011/0208749 A1* | 8/2011 | Guo | G06Q 30/02 |
| | | | 707/748 |
| 2014/0040020 A1* | 2/2014 | Shanmugam | G06Q 30/02 |
| | | | 705/14.45 |
| 2014/0321831 A1* | 10/2014 | Olsen | G11B 27/034 |
| | | | 386/241 |
| 2017/0041568 A1* | 2/2017 | Rakshit | G06F 3/0346 |

OTHER PUBLICATIONS

ISR for PCT/EP2015/064452, dated Sep. 23, 2015, pp. 1-3.

Chang et al: "Keyword-based Video Summarization Learning Platform with Multimodal Surrogates"; Advanced Learning Technologies (ICALT), 2011.

Wu et al: "Video summarization via crowdsourcing". In CHI 11 Extended Abstracts on Human Factors in Computing Systems; CHI EA, 2011; pp. 1531-1536.

* cited by examiner

METHOD AND APPARATUS FOR CREATING A SUMMARY VIDEO

This application claims the benefit, under 35 U.S.C. § 365 of International Application PCT/EP2015/064452, filed 25 Jun. 2015, which was published in accordance with PCT Article 21(2) on 30 Dec. 2015, in English, which claims the benefit of European Patent Application No. 14306017.6 filed 27 Jun. 2014, herein incorporated by reference.

FIELD OF INVENTION

The present disclosure generally relates to the automatic creation of a video summary based on a keyword search and social network analysis.

BACKGROUND

With the prevalence of online content sharing, collaboration, and social media, many users are continuously uploading media content (e.g., pictures and video) to the Internet. In some instances, several users attending a single event may upload several hundreds of pieces of content from various devices to several different online content sharing and social websites. In other instances, many different users may provide content around similar ideas or concepts that are actively being discussed.

Once this content is uploaded, communities of users may comment on the various pieces of content, where some content may be seen more popular or viewed at a higher frequency than others. At times, some users may scour the various pieces of content from a single event or content that discuss similar ideas and/or subjects to manually create a new aggregated piece of content, such as a video mix, to form summary of an event, idea, or subject, for example. Since this manual process may be long and burdensome, there is a need for the automatic creation of video summaries around an event, idea, subject, etc.

However, one drawback from an automatic creation of a video summary from potentially hundreds of pieces of content is that there may be little control in the selection of quality content and/or content created by known users that is used to create the video summary. Therefore, there is a need for the ability to automatically create a video mix summary from a set of videos that also enable the user to define the types of content to be included in the video mix, where the types of content may be based on varying metrics that may be defined by a video summary system, the user, or within a social network of users.

BRIEF SUMMARY

Some embodiments provide a method and apparatus for creating a summary video based on a social network analysis via a social network of users. Some embodiments provide for receiving a keyword query from a user wishing to create a summary video from several videos. Comments, which may or may not be synchronized to the video timeline, related to the several videos may be retrieved based on the keyword query. Pre-selected video segments may then be provided based on the retrieved comments. Social metrics may then be assigned to the pre-selected video segments. A social curve for the video summary may then be received by the user, and a summary video based on the social curve can then be created, where the summary video is a combination of a set of pre-selected video segments.

The preceding Summary is intended to serve as a brief introduction to some embodiments of the present disclosure. It is not meant to be an introduction or overview of all inventive subject matter disclosed in this document. The Detailed Description that follows and the Drawings (or "Figures" or "FIGs.") that are referred to in the Detailed Description will further describe some of the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the disclosure are set forth throughout this specification. However, for purpose of explanation, some embodiments are set forth in the following drawings.

DETAILED DESCRIPTION

In the following detailed description, numerous details, examples, and embodiments are set forth and described. However, it will be clear and apparent to one skilled in the art that the disclosure is not limited to the embodiments set forth, and that the disclosed embodiments may be practiced without some of the specific details and examples discussed.

Throughout this disclosure several terms may be used to refer to different aspects of the automatic video summary creation process according to the present disclosure. A video segment refers to a continuous interval in a video (e.g., source video). Any reference to the term video is meant to convey a video signal with all its synchronized audio signals as a whole, where a video may also include animations, GIFs, and other similar multimedia content. A viewer is a user who posted one or more comments on one or more videos. Viewers may be organized into a social network in some embodiments. A comment is a document that is attached to a particular viewer and may be characterized by a set of text tags or keywords. Some comments may also be synchronized with a video's timeline, meaning that for each of these synchronized comments, there is a known link to a video segment. The user is the person who wants to build the summary video using video segments from all other videos. A social curve is a curve specifying the social score aspects of the video summary that is being built.

Some embodiments of the present disclosure provide a system and method that allows users to automatically generate a video summary from several videos, hereinafter source videos, based on video segments extracted from the several videos. The video summary can be produced automatically by a user specifying a keyword query and a social curve aligned to the desired video summary's timeline. To accomplish this, some embodiments may use textual data that is synchronized with the source videos' timelines. This data may be viewer comments that discuss particular time points or time periods in the source videos. A social network of these viewers may also be utilized in order to better select, rank, and/or order video segments to be included in the video summary.

For example, a web site that hosts videos and viewer comments associated with these videos may be a platform for executing the system and methods of the present disclosure. On such a video hosting platform, registered users may have the possibility to post comments in the feed of videos. Theses commenters may also explicitly specify the time point in the video that is being discussed. For example, the comment, "LOL 3:24," may be provided to indicate that the commentator saw something funny at minute 3'24".

Based on the several comments found on a video hosting website, a social network of viewers may be built based on viewers who co-comment on the same videos, viewers who subscribed or follow other viewers, friendship links, number of comments by a viewer, number of up-votes/down-votes received on comments by the viewer, etc. An exemplary implementation of how a video summary may be accomplished according to the present disclosure will now be described in reference to FIG. 1.

Figure 1:
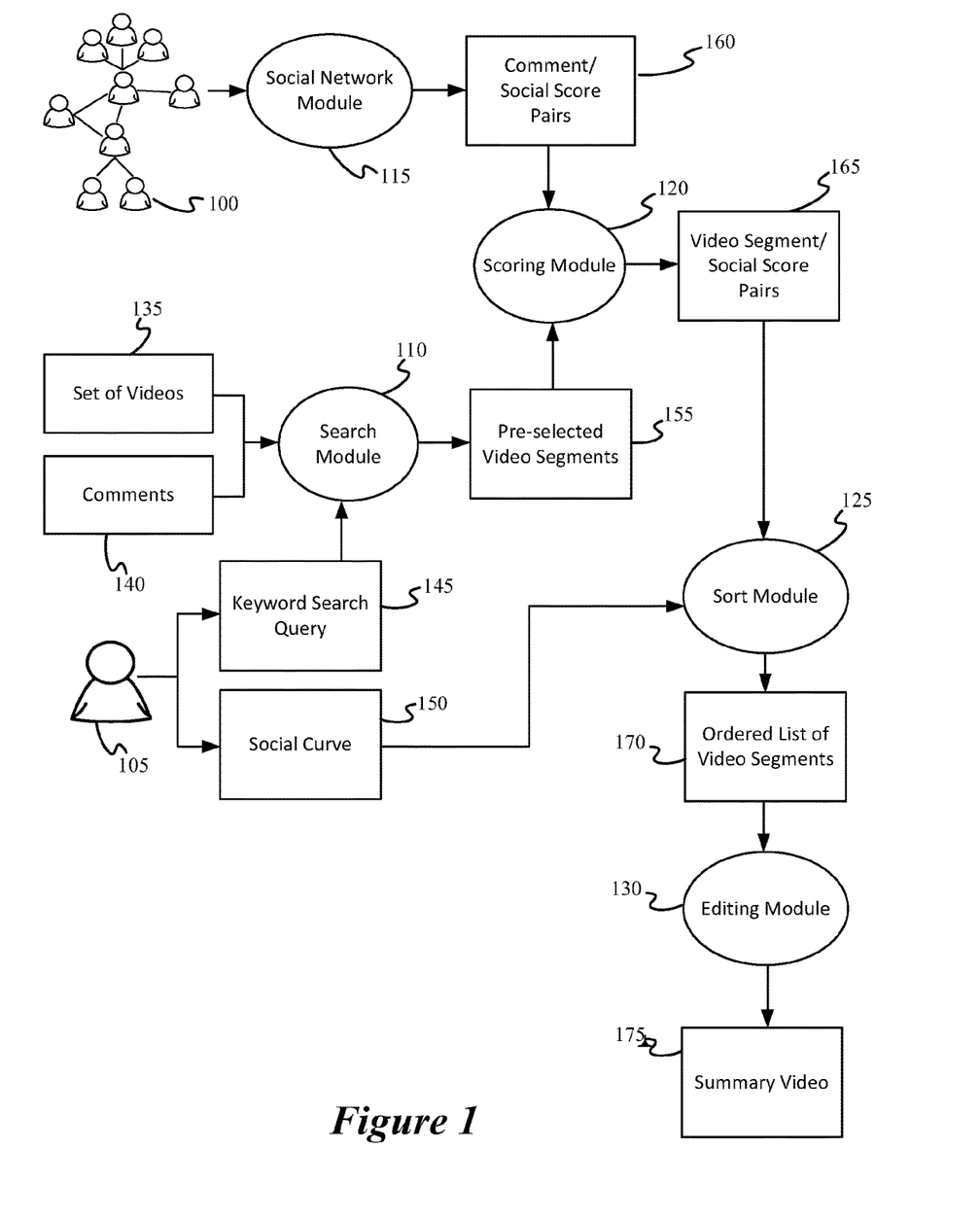
FIG. 1 illustrates a block diagram of an exemplary system for implementing an application for automatically creating a summary video according to one embodiment of the present disclosure.

FIG. 1 illustrates a block diagram of an exemplary system for automatically creating a summary video according to one embodiment of the present disclosure. FIG. 1 includes a social network of viewers 100, a user 105, a search module 110, a social network module 115, a scoring module 120, a sort module 125, and an editing module 130. The various inputs and outputs illustrated in FIG. 1 include a set of videos 135 from one or more video hosting platforms, comments 140 made on the set of videos 135, keyword search queries 145 and a social curve 150 provided by the user, pre-selected video segments with 155, comment and social score pairings 160, video segment and social score pairings 165, ordered lists of video segments 170, and the summary video 175 provided by the system.

The system of the present disclosure may make use of one or more video hosting platforms that provide videos with a corresponding viewer comment thread, where some comments may be synchronized to the timeline of the video. A user 105 that wants to build a video summary from a set of videos 135 may use the video hosting platform's traditional search engine to select a set of videos 135 about a particular subject and/or event, for example. In this search, keywords that may be in the description of the videos or in the video tags and/or titles may be searched.

The user 105 may then continue to the process of pre-selecting a set of video segments using a search module 110. This may be accomplished by the search module 110 via a keyword search query 145 that matches comments that may or may not be synchronized to the timelines in the set of videos. Specifically, the search module 110 returns a set of matched comments and the video segments 155 based on the keyword search query 145.

A social network module 115 may analyze a social network of viewers 100 and assign a scoring metric to each viewer (e.g., influence scores, expert scores, etc.). The scoring metric may interchangeably be referred to as a social score throughout this disclosure. The social network may be built by considering viewers 100 that have commented on the set of videos, or only viewers 100 who commented on the subset of pre-selected video segments 155. As a result of this social network module 115, each comment (not necessarily a synchronized comment) may be assigned the social score 160 of its viewer. In another embodiment, the social score 160 may be associated to each comment rather than to its creator and is evaluated as a function (e.g., weighted function) of its creator's social score and of the comment's own score. The final comment score 160 or metric may be evaluated according to its position within the discussion thread it belongs to (e.g. lead comment, response comment, ending comment, etc.), the length of the discussion thread, the number of comments that have been later posted and relating to this comment, the number of viewers who co-commented on the same videos, viewers who subscribed or follow other viewers, friendship links, number of comments by a viewer, number of up-votes/down-votes received on comments by the viewer, etc. One of ordinary skill in the art will recognize that various appropriate methods may be used to ascertain any type of metric to video segments and/or comments based on the available data points provided within a video hosting platform.

The scoring module 120 may then aggregate the social scores 160 of comments for each pre-selected video segment 155 and compute a social score for the video segment 165. For example, a video segment social score 165 for any particular pre-selected video segment 155 may be the sum, the median or the mean of the scores 160 or of a part of the scores 160 (e.g., a function applied on the best 50%, or the worst 67%, or the part of the scores 160 that is in the range of the best 40%-90%.)

Figure 2:
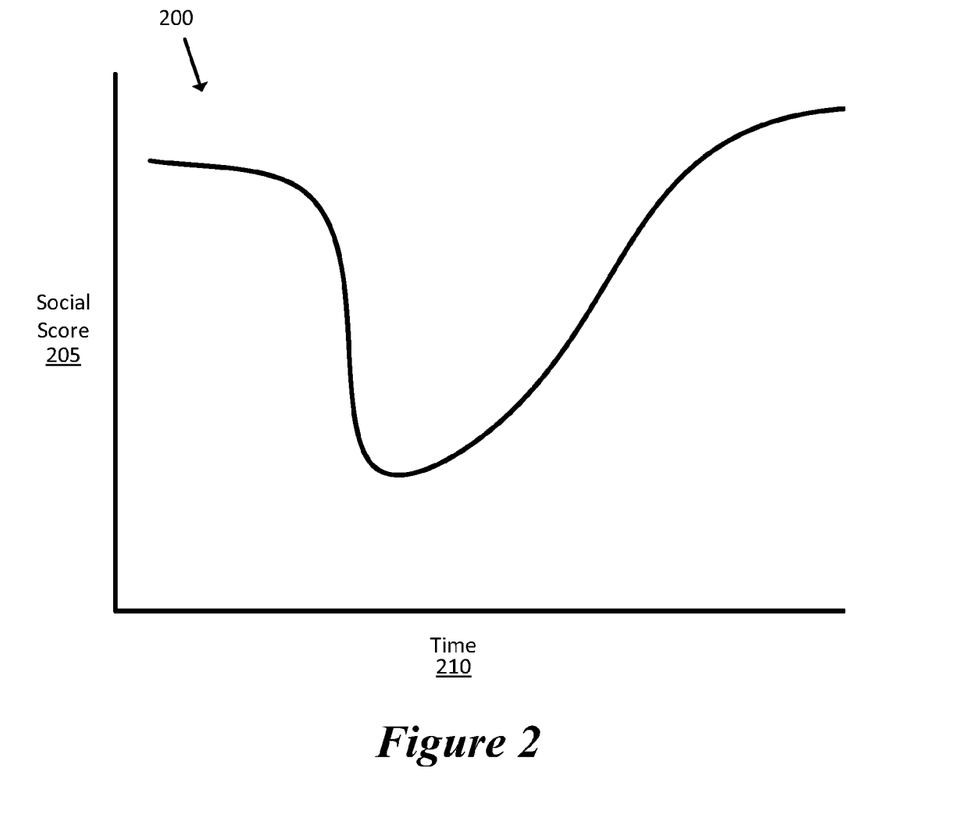
FIG. 2 illustrates an exemplary social curve used by some embodiments.

The user 105 may also pre-define a social curve 150 using a graphical interface, for example. FIG. 2 illustrates an exemplary social curve 200 where a social score 205 is mapped on a y-axis and a time duration 210 of the video summary to be created is mapped along the x-axis. Using a social curve interface, the user 150 may pre-define the preferred duration 205 of the video summary, and draw freehand the general shape (i.e. social curve 200) of social score the user 105 wants to use for the video summary. The social curve 200 enables the user to alternate between video segments
that were commented on by important people in the social network of viewers 100 and others that were not commented on by known and/or highly rated people within the social network of viewers 100.

The sort module 125 may then use the social curve 150 provided by the user 105 and order the pre-selected video segments 165 so as to concur with the social curve 150. For example, a higher value of the curve should indicate a video segment with a higher social score. The sort module 125 may also discard video segments in cases where the video segments are too numerous or too long. The sort module 125 then returns an ordered list of selected video segments 170 for the final video summary.

The ordering of video segments may be conducted in various ways. For example, a user 105 provides the desired social curve 150, where the curve dictates the duration of the summary video along the x-axis. Then each video segment 165 may be compared with the social score specified by the social curve 150 at a corresponding time along the time axis. The analysis may be integrated over the duration of the considered video segments. The video segments 165 that best fit the integrated social curve level 205 (e.g., exact value±delta/difference) are then identified. When several video segments are identified as fitting the social curve 150, one of the video segments 165 may be selected at random or based on a defined selection criteria for selecting one out of many potential video segments. The sorting may be an optimization where the goal may be to minimize the area under the absolute value of the social curve 200 minus the social curve of the ordered video segments 170. An additional regularization parameter may assist in controlling the length of the selected video segments 165.

Another exemplary method for selecting one of the matching video segments 165 is to select the video segment that best fits the curve displacement or, when several video segments 165 are best fits for the curve, selecting one of the best fits at random. In some embodiments, if the curve is sharp (high valued derivatives), the shortest video clips may be selected. If the curve is flat, a few short video segments and a longer video segment may be selected.

Eventually, the editing module 130 takes the ordered list of video segments 170 and builds the final video summary 175. The editing module 130 may add transitions between video sequences so both the audio signal and the video signal between two video segments transition smoothly. For example, fading techniques may be applied from segment to segment.

Figure 3:
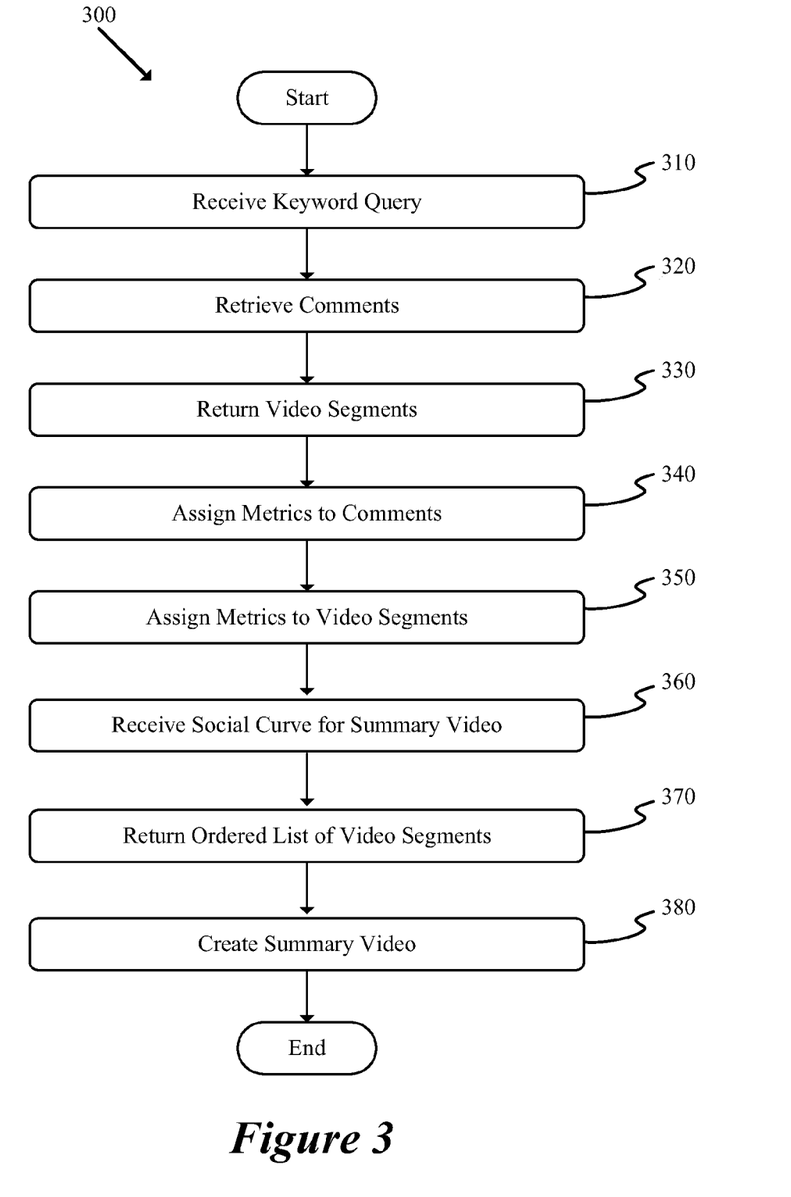
FIG. 3 illustrates a flow chart of an exemplary process used in some embodiments for creating a summary video according to the present disclosure.

FIG. 3 illustrates a flow chart of an exemplary process 300 used in some embodiments for creating a summary video according to the present disclosure. The process 300 may begin by receiving (at step 310) a keyword query from a user. The process 300 may then retrieve (at step 320) all comments that are relevant to the keyword query using a search module 110 similar to the one described in FIG. 1. Some or all of the retrieved comments may be synchronized comments that identify a time or segment of the video for which the comment corresponds to. Then the module 110 returns (at step 330) video segments that are related to the comments. For comments that are not synchronized comments, the entire video may be treated as a single video segment. Synchronized comments that identify a time may treat a pre-defined duration of the video as a video segment, where the video segment begins at the identified time and ends at a pre-defined duration. Synchronized comments that identify a complete segment (e.g., identify a start and end time or duration) will return the appropriate portion as a video segment in step 330.

Using a social network of viewers, the process 300 may then infer a social metric or score for each viewer and assign (at step 340) the social metric to each viewer's comments. The process 300 may then use a scoring module to assign (at step 350) a social metric to each pre-selected video segment from step 330 based on the social metrics of the video segment's related comments assigned at step 340.

The process 300 then receives (at step 360) a social curve (e.g., 200) specified by a user for the video summary to be created. This social curve specifies the alternation between high scored and low-scored parts of the video summary. The process 300 may then use a sort module to return (at step 370) an ordered list of the selected video segments based on the social metrics of the video segments so that the order of video segments follow the social curve received at 360. Finally, the process 300 may create (at step 380) a summary video using an editing module via the ordered list of video segments from 370.

One of ordinary skill in the art will recognize that process 300 may be performed in various appropriate ways without departing from the scope of the disclosure. For instance, the process may not be performed as one continuous series of operations in some embodiments. In addition, the process may be implemented using several sub-processes or as part of a larger macro-process. Furthermore, various processes may be performed concurrently, sequentially, or some combination of sequentially and concurrently. Moreover, the operations of the process may be performed in different orders.

Figure 4:
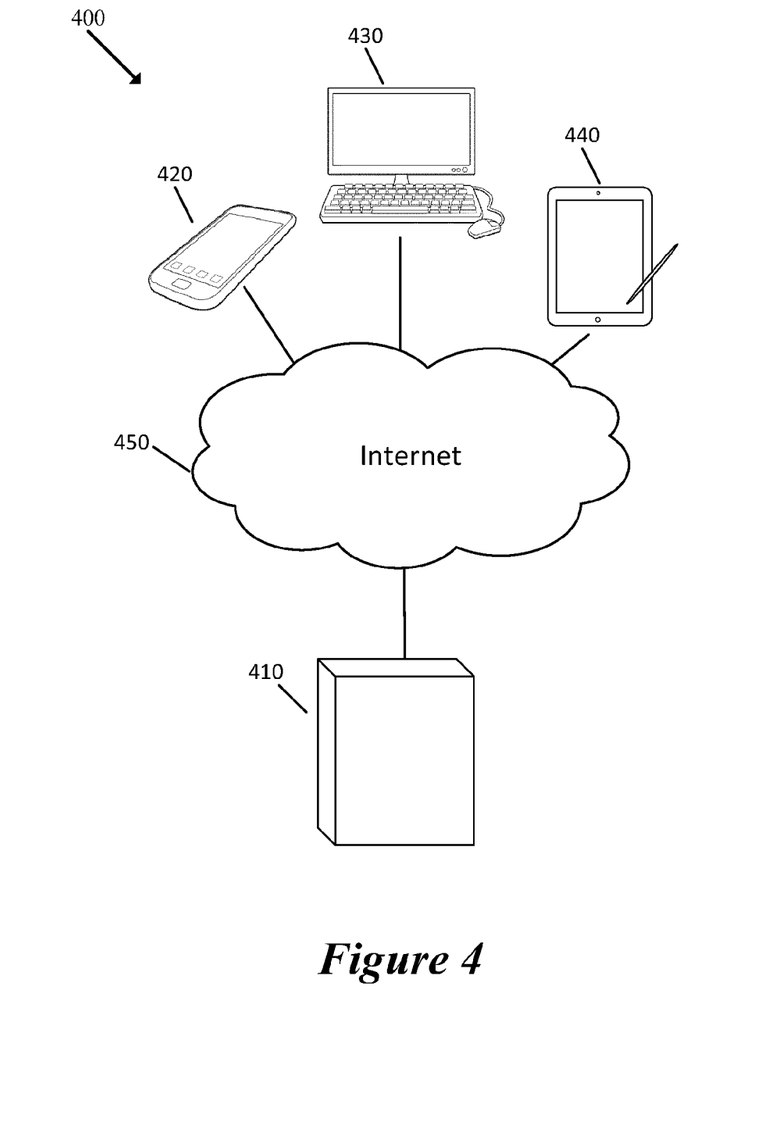
FIG. 4 illustrates an exemplary block diagram of a system for implementing a summary video creation process according to some embodiments of the present disclosure.

FIG. 4 illustrates an exemplary block diagram of a system 400 for implementing a summary video creation process or engine according to some embodiments of the present disclosure. The system 400 includes a server 410 and one or more electronic devices such as smart phones 420, personal computers (PCs) (e.g., desktops or laptops) 430, and tablets 440. The server 410 provides support for the summary video creation processes and/or engine according to the present disclosure as well as for hosting videos used in the video summary and/or the summary video itself via the Internet 450. In some embodiments, users may access the summary video engine on the server 410 and provide a keyword search query and social curve via a browser or application on the electronic devices.

In some embodiments, the above-described operations may be implemented as on a particular machine such as a desktop computer, laptop, handheld device (e.g. smartphone or tablet), one or more servers accessible via the Internet, or any combination of such devices. Many of the processes and modules described may also be implemented as software processes that are specified as at least one set of instructions recorded on a non-transitory computer readable storage medium. When these instructions are executed by one or more computational elements (e.g., microprocessors, microcontrollers, Digital Signal Processors ("DSPs"), Application-Specific ICs ("ASICs"), Field Programmable Gate Arrays ("FPGAs"), etc.) the instructions cause the computational element(s) to perform actions specified in the instructions.

Figure 5:
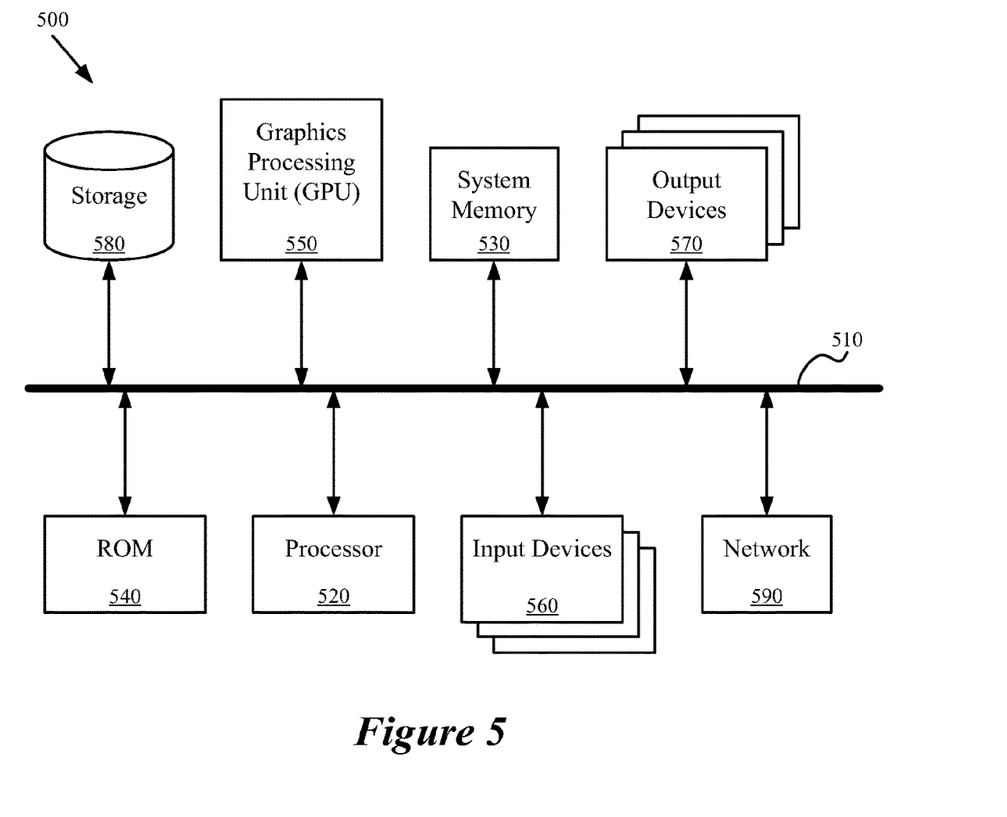
FIG. 5 illustrates a schematic block diagram of an exemplary computer system with which some embodiments may be implemented.

FIG. 5 illustrates a schematic block diagram of a computer system 500 with which some embodiments of the disclosure may be implemented. For example, the system described above in reference to FIG. 1 may be at least partially implemented using computer system 500. As another example, the processes described in reference to FIG. 3 may be at least partially implemented using sets of instructions that are executed using computer system 500.

Computer system 500 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 500 may include a bus 510, at least one processing element 520, a system memory 530, a read-only memory ("ROM") 540, other components (e.g., a graphics processing unit) 550, input devices 560, output devices 570, permanent storage devices 580, and/or a network connection 590. The components of computer system 500 may be electronic devices that automatically perform operations based on digital and/or analog input signals.

Bus 510 may represent all communication pathways among the elements of computer system 500. Such pathways may include wired, wireless, optical, and/or other appropriate communication pathways. For example, input devices 560 and/or output devices 570 may be coupled to the system 500 using a wireless connection protocol or system. The processor 520 may, in order to execute the processes of some embodiments, retrieve instructions to execute and data to process from components such as system memory 530, ROM 540, and permanent storage device 580. Such instructions and data may be passed over bus 510.

ROM 540 may store static data and instructions that may be used by processor 520 and/or other elements of the computer system. Permanent storage device 580 may be a read-and-write memory device. This device may be a non-volatile memory unit that stores instructions and data even when computer system 500 is off or unpowered. Permanent storage device 580 may include a mass-storage device (such as a magnetic or optical disk and its corresponding disk drive, flash memory/storage, SIM cards, etc).

Computer system 500 may use a removable storage device and/or a destination storage device as the permanent storage device. System memory 530 may be a volatile read-and-write memory, such as a random access memory ("RAM"). The system memory may store some of the instructions and data that the processor uses at runtime. The sets of instructions and/or data used to implement some embodiments may be stored in the system memory 530, the permanent storage device 580, and/or the read-only memory 540. For example, the various memory units may include instructions for authenticating a client-side application at the server-side application in accordance with some embodiments. Other components (e.g. 550) may perform various other functions. These functions may include interfacing with various communication devices, systems, and/or protocols.

Input devices 560 may enable a user to communicate information to the computer system and/or manipulate various operations of the system. The input devices may include keyboards, cursor control devices, audio input devices and/or video input devices. Output devices 570 may include printers, displays, and/or audio devices. Some or all of the input and/or output devices may be wirelessly or optically connected to the computer system.

Finally, as shown in FIG. 5, computer system 500 may be coupled to a network through a network adapter 590. For example, computer system 500 may be coupled to a web server on the Internet such that a web browser executing on computer system 500 may interact with the web server as a user interacts with an interface that operates in the web browser.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 500 may be used in conjunction with the disclosed embodiments. Moreover, one of ordinary skill in the art will appreciate that many other system configurations may also be used in conjunction with the disclosed embodiments or components of the embodiments.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the disclosure has been described with reference to numerous specific details, one of ordinary skill in the art will recognize that the disclosure can be embodied in other specific forms without departing from the scope of the disclosure. For example, several embodiments were described above by reference to particular features and/or components. However, one of ordinary skill in the art will realize that other embodiments might be implemented with other types of features and components, and that the disclosure is not to be limited by the foregoing illustrative details.

The invention claimed is:

1. A method for creating a summary video from a plurality of videos comprising a plurality of video segments and associated comments, the method comprising:
retrieving text comments based on a keyword query, wherein the keyword query searches at least text comments associated with the plurality of videos segments;
retrieving video segments associated with the retrieved comments;
assigning social scores to the video segments, wherein the social scores are based on at least ratings of users that provided the comments associated to the video segment;
receiving a social curve for the video summary, wherein the social curve defines a required value of social score spanning the timeline of the expected summary video;
ordering the retrieved video segments by selecting video segments whose social score best fit the social curve; and
creating the summary video composed by the succession of ordered retrieved video segments.

2. The method of claim 1, wherein the comments are synchronized comments that refer to a particular time or segment of an associated video.

3. The method of claim 1, wherein assigning social score to a video segment is further based on a rating of the associated comment.

4. The method of claim 1, wherein assigning social score to a video segment is further based on a comment position within a discussion thread of a video comprising a video segment associated with the comment.

5. The method of claim 1, wherein assigning social score to a video segment is further based on a length of a discussion thread of a video comprising a video segment associated with the comment.

6. The method of claim 1, wherein assigning social score to a video segment is further based on a number of comments relating back to the comments related to the video segment.

7. The method of claim 1, wherein a video segment is chosen at random for incorporation into the summary video when one or more videos conforms to a particular subset of the social curve.

8. The method of claim 1 wherein ordering the video segment further comprises selecting short video segments when a slope of the social is sharp and long video segments when the social curve is flat.

9. The method of claim 1, wherein creating the video summary further comprises adding transitions between the video segments.

10. The method of claim 1 wherein the social curve is specified by a user.

11. The method of claim 1 wherein the social curve is hand-drawn by a user.

12. The method of claim 1, wherein ordering the video segment further comprises minimizing the difference between the social curve and the social scores.

13. An apparatus configured to create a summary video from a plurality of videos, comprising a processor configured to:

retrieve text comments based on a keyword query, wherein the keyword query searches at least text comments associated with the plurality of videos segments;

retrieve video segments associated with the retrieved comments;

assign social scores to the video segments, wherein the social scores are based on a weighted function of ratings of the retrieved comment and of ratings of users that provided the comments associated to the video segment;

receive a social curve for the video summary, wherein the social curve defines a required value of social score spanning the timeline of the expected summary video;

order the retrieved video segments by selecting video segments whose social score best fit the social curve; and create the summary video composed by the succession of ordered retrieved video segments.

14. The apparatus of claim 13, wherein the comments are synchronized comments that refer to a particular time or segment of an associated video.

15. The apparatus of claim 13, wherein assigning social score to a video segment is further based on a rating of the associated comment.

16. The apparatus of claim 13, wherein assigning social score to a video segment is further based on a number of comments relating back to the comments related to the video segment.

17. The apparatus of claim 13, wherein ordering the video segment further comprises selecting short video segments when a slope of the social is sharp and long video segments when the social curve is flat.

18. The apparatus of claim 13, wherein the social curve is specified by a user.

19. The apparatus of claim 13, wherein the social curve is hand-drawn by a user.

20. The apparatus of claim 13, wherein ordering the video segment further comprises minimizing the difference between the social curve and the social scores.

* * * * *